(12) United States Patent
Norris et al.

(10) Patent No.: US 6,611,646 B1
(45) Date of Patent: Aug. 26, 2003

(54) HYBRID STRENGTH MEMBER FOR AN OPTICAL CABLE

(75) Inventors: Richard Hartford Norris, Powder Springs, GA (US); Richard D. Small, Lilburn, GA (US); Phillip Maurice Thomas, Suwanee, GA (US); Peter A. Weimann, Atlanta, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/415,881

(22) Filed: Oct. 8, 1999

(51) Int. Cl.[7] .................................................. G02B 6/44
(52) U.S. Cl. ......................... 385/113; 385/111; 385/112
(58) Field of Search .............................. 385/109–114; 43/18.5; 428/35, 36, 251, 365; 174/68.1

(56) References Cited

U.S. PATENT DOCUMENTS

| | | | |
|---|---|---|---|
| 4,178,713 A | * 12/1979 | Higuchi ........................... 43/18 |
| 4,743,085 A | 5/1988 | Jenkins et al. .......... 350/96.23 |
| 4,844,575 A | 7/1989 | Kinard et al. ........... 350/96.23 |
| 5,109,457 A | 4/1992 | Panuska et al. ............. 385/102 |
| 5,125,063 A | 6/1992 | Panuska et al. ............. 385/113 |
| 5,187,763 A | 2/1993 | Tu ............................... 385/100 |
| 5,229,851 A | 7/1993 | Rahman ..................... 835/114 |
| 5,838,864 A | 11/1998 | Patel et al. ................. 385/113 |

* cited by examiner

*Primary Examiner*—Michael P. Stafira
*Assistant Examiner*—Michael P. Mooney
(74) *Attorney, Agent, or Firm*—Michael A. Morra

(57) ABSTRACT

A hybrid strength member (300) for an optical cable (10) is made from dielectric materials, and provides excellent compressive and tensile properties within a single structure. The strength member includes two concentric layers of filamentary strands that are embedded in a thermoset material such as epoxy. The filamentary strands of the inner layer (310) primarily comprise aramid fibers, while the filamentary strands of the outer layer (320) primarily comprise glass fibers. A pair of strength members (300-1, 300-2) is embedded in a plastic jacket of the optical cable at diametrically opposite sides of a central core tube that contains a number of optical fibers. Each strength member includes a thin coating (330) of a relatively soft material (i.e., a hardness of less than 80D on the Shore durometer scale) to enhance its coupling to the plastic jacket. Moreover, each strength member has a compressive stiffness that is effective to inhibit substantial contraction of the cable, and a tensile stiffness that is effective to receive tensile loads without substantial transfer of such loads to the glass fibers.

19 Claims, 3 Drawing Sheets

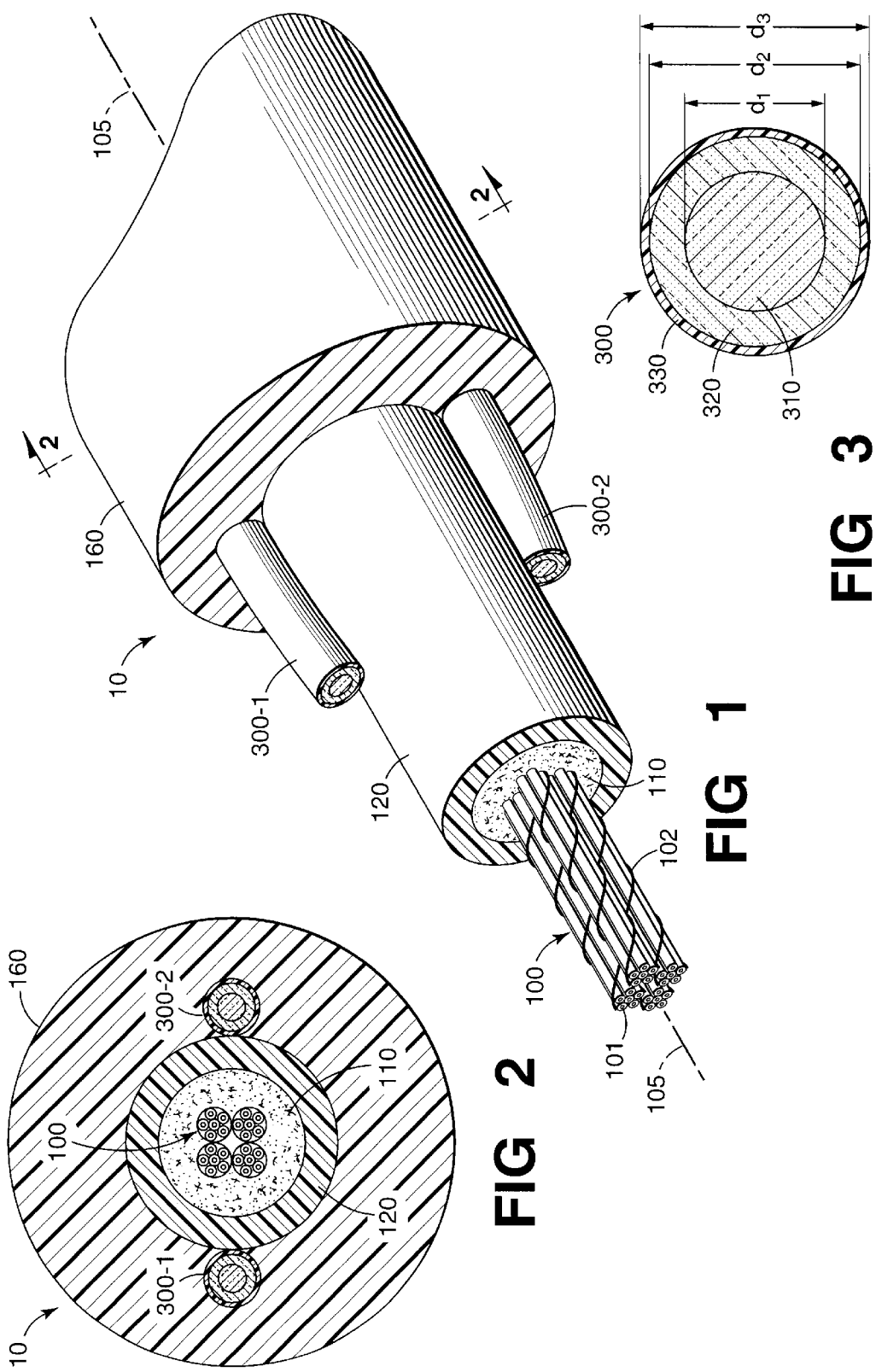

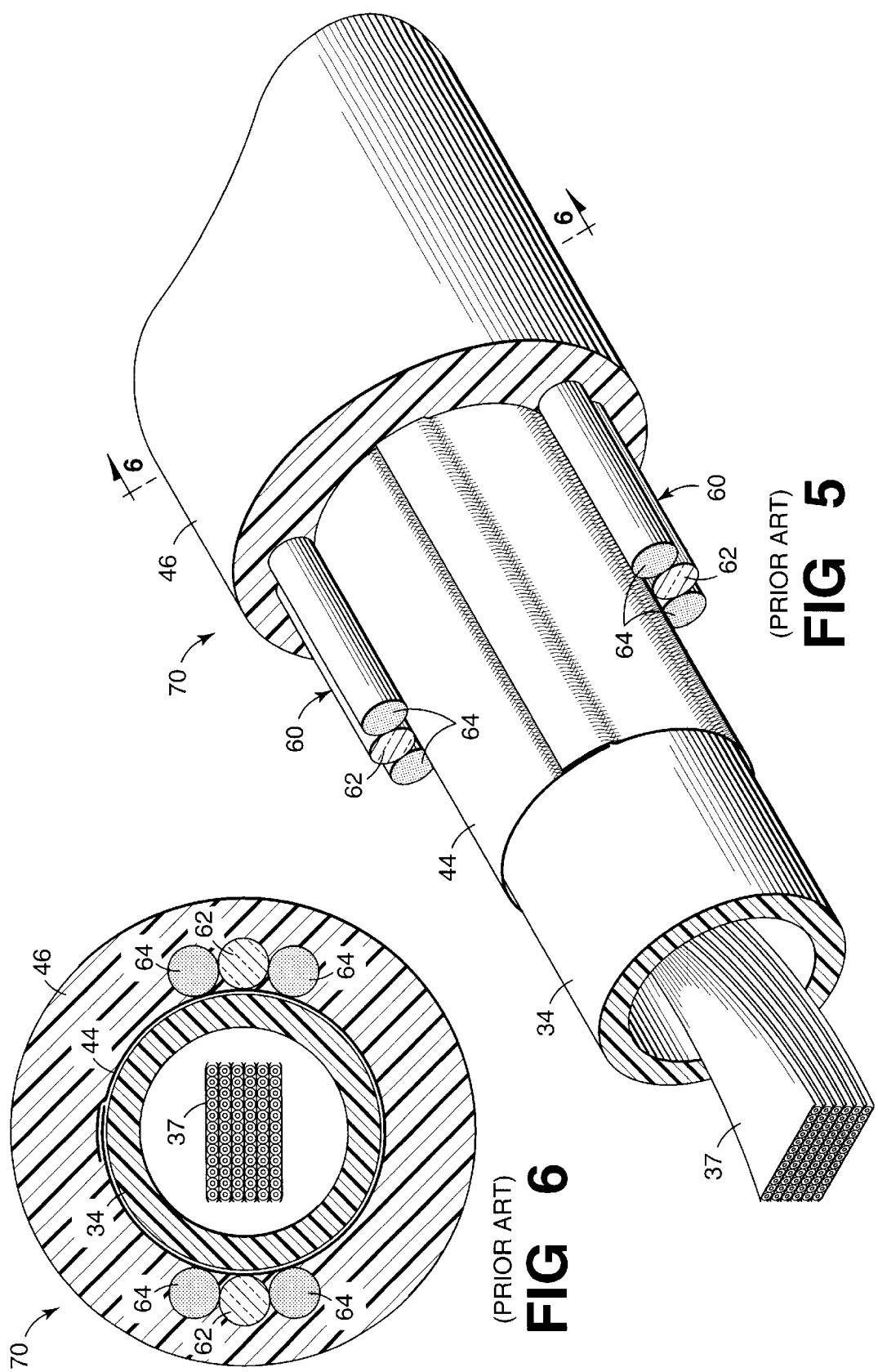

HYBRID STRENGTH MEMBER FOR AN OPTICAL CABLE

TECHNICAL FIELD

This invention relates to optical cables and, more particularly, to the design of non-metallic strength rods used therein.

BACKGROUND OF THE INVENTION

Optical fibers are in widespread use today as transmission media because of their large bandwidth capabilities and small size. However, optical fibers are mechanically fragile, exhibiting low strain fracture under tensile loading and degraded light transmission when bent. Transmission degradation, which results from bending, is referred to as macrobending and microbending losses. Consequently, cable structures have been developed to protect the optical fibers in various situations. Additionally, optical cables use glass fibers as a communications medium rather than copper wires; and while glass fibers are relatively strong, care must be taken to avoid excessive tensile stress because they are quite thin and are not ductile. Moreover, the optical transmission characteristics (e.g., index of refraction) of glass change in response to the application of stress. Therefore, strength members are generally included in optical cables to receive most or all of the stress due to tensile loading before it can be transferred to the optical fibers.

An optical cable having excellent strength performance is described in U.S. Pat. No. 4,844,575 that issued to Kinard et al. on Jul. 4, 1989. This cable comprises one or more optical fibers that are disposed within a cylindrical plastic tube, and a pair of metallic rods that are positioned on diametrically opposite sides of the tube and extend along the length of the cable. Steel is a preferred strength member for an optical cable because its tensile stiffness is suitable for receiving axial loading and its compressive stiffness is suitable for inhibiting contraction of the cable. Moreover, the cross-section area of a steel strength member is relatively small in comparison with other materials so that it does not undesirably increase the overall diameter of the optical cable. Nevertheless, there has been a long felt need for an all-dielectric cable construction. Such a cable could be strung from building ducts to service distribution points, and would obviate the need for grounding connections at splice points that add to the cost of cable installations. Further, such a dielectric cable would decrease the probability of lightning strikes.

A dielectric optical cable having excellent strength performance is disclosed in U.S. Pat. No. 5,109,457 that issued to Panuska et al. on Apr. 28, 1992. In this patent, the metallic rods of the Kinard et al. patent are replaced with non-metallic rods for tensile and compressive stiffness, and non-metallic rovings for added tensile stiffness. The rods are made from E-glass fiber filaments that have been impregnated with epoxy, and the rovings are made from E-glass fiber filaments without epoxy. FIGS. 5 and 6, herein, show this all-dielectric optical cable in greater detail. This combination of rods and rovings provides excellent strength and flexibility in a relatively small-diameter cable; however, it is desirable to minimize the number of components in a strength member system to simplify its manufacture. Merely increasing the diameter of the glass rods to eliminate the rovings unduly increases the overall diameter of the cable.

A dielectric strength member system constructed entirely of filamentary strands, e.g., yarn, with superior tensile modulus is desired in order to minimize the overall cross section area of the strength members and hence, the completed cable. Alternatively, a strength member system consisting of high tensile modulus filaments within an epoxy matrix is desired for improved compressive properties as well as minimal cross-section area. A composite strength member, consisting of aramid fibers within an epoxy matrix is commercially available from NEPTCO, for example, under the name ARALINE®. Such strength members are known to possess tensile moduli that are superior to glass strength member of equal cross-section area. However, they are also known to have compressive properties such as modulus and strength) that may be insufficient to adequately isolate the optical fibers in the completed cable from stresses or strains imposed on the cable during manufacture, installation, or subsequent handling after installation.

Dielectric crossply sheaths having one or more layers of helically disposed rods and rovings are also well known. An example of a cable having such a strength system is disclosed in U.S. Pat. No. 4,743,085. This construction typically provides for the most flexible and compact structure, but it is relatively expensive to manufacture such a cable due to the increased number of elements, and its kink resistance is relatively low due to reduced strength member size and jacket thickness.

Accordingly, it is desirable to provide a dielectric strength system for an optical cable that minimizes strength member cross-section area while still providing suitable compressive and tensile properties.

SUMMARY OF THE INVENTION

A hybrid strength member for an optical cable is made from all-dielectric materials, and provides excellent compressive and tensile properties within a single structure. Each strength member (also referred to as a rod) includes two concentric layers of filamentary strands that are embedded in a thermoset material. One layer primarily comprises filamentary strands whose tensile modulus exceeds 12 million pounds per square inch (psi) for tensile strength, while the other layer primarily comprises glass and/or ceramic fibers for compressive strength. The dielectric rods have compressive properties that are effective to inhibit substantial contraction of the cable during thermal cycling and to withstand compressive loads imposed on the cable during installation and handling. The dielectric rods also have a tensile modulus that is effective to receive tensile loads without substantial transfer of same to the glass fibers.

In an illustrative embodiment of the invention, two layers (inner and outer) of filamentary strands are used to construct the hybrid strength member. The inner layer of filamentary strands comprises packages of aramid fibers while the outer layer comprises packages of glass fibers. These packages are coated with heated epoxy and then passed through a die for consolidation and removal of excess epoxy. The resulting rod is then cured via multiple cooling stages. During passage through the die and subsequent cooling, a differential tension is maintained between the aramid and glass fibers to compensate for differential thermal expansion effects.

The dielectric rod is intended for use in an optical cable where it is at least partially embedded in a plastic jacket of the cable to receive compressive and tensile loading. To that end, the dielectric rod may be coated with a material to enhance coupling, without adhesion, between the rod and the plastic jacket. The coating is selected to be chemically different from the jacket material in order to prevent adhesion. Further, the material should be relatively soft to provide a high coefficient of friction with the jacket. Illustratively, the coating material has a hardness that is less than 80 D on the Shore durometer scale and comprises a thermoplastic elastomer, a crosslinkable rubber or a hot melt composition.

In the illustrative embodiment of the invention, dielectric rods are positioned on diametrically opposite sides of a tubular member (core tube) that includes a number of optical fibers. Optionally, a waterblocking filling material is used to fill any voids within the core tube. In a preferred embodiment of the invention, the dielectric rods are linearly positioned within the cable and are substantially parallel to its longitudinal axis. Nevertheless, smaller-diameter dielectric rods may be installed in the cable with helical stranding or with a reverse-oscillating lay (also known as an "S-Z" twist).

BRIEF DESCRIPTION OF THE DRAWING

The invention and its mode of operation will be more clearly understood from the following detailed description when read with the appended drawing in which:

FIG. 1 is a perspective view of an optical cable having an improved strength system in accordance with the invention;

FIG. 2 is a cross-section view of the cable of FIG. 1, illustrating certain elements of the cable in detail;

FIG. 3 is a cross-section view of an hybrid strength member for use in an optical cable according to the present invention;

FIG. 5 is a perspective view of a known optical fiber cable; and

FIG. 6 is a cross-section view of the cable shown in FIG. 5.

DETAILED DESCRIPTION

Figure 4:
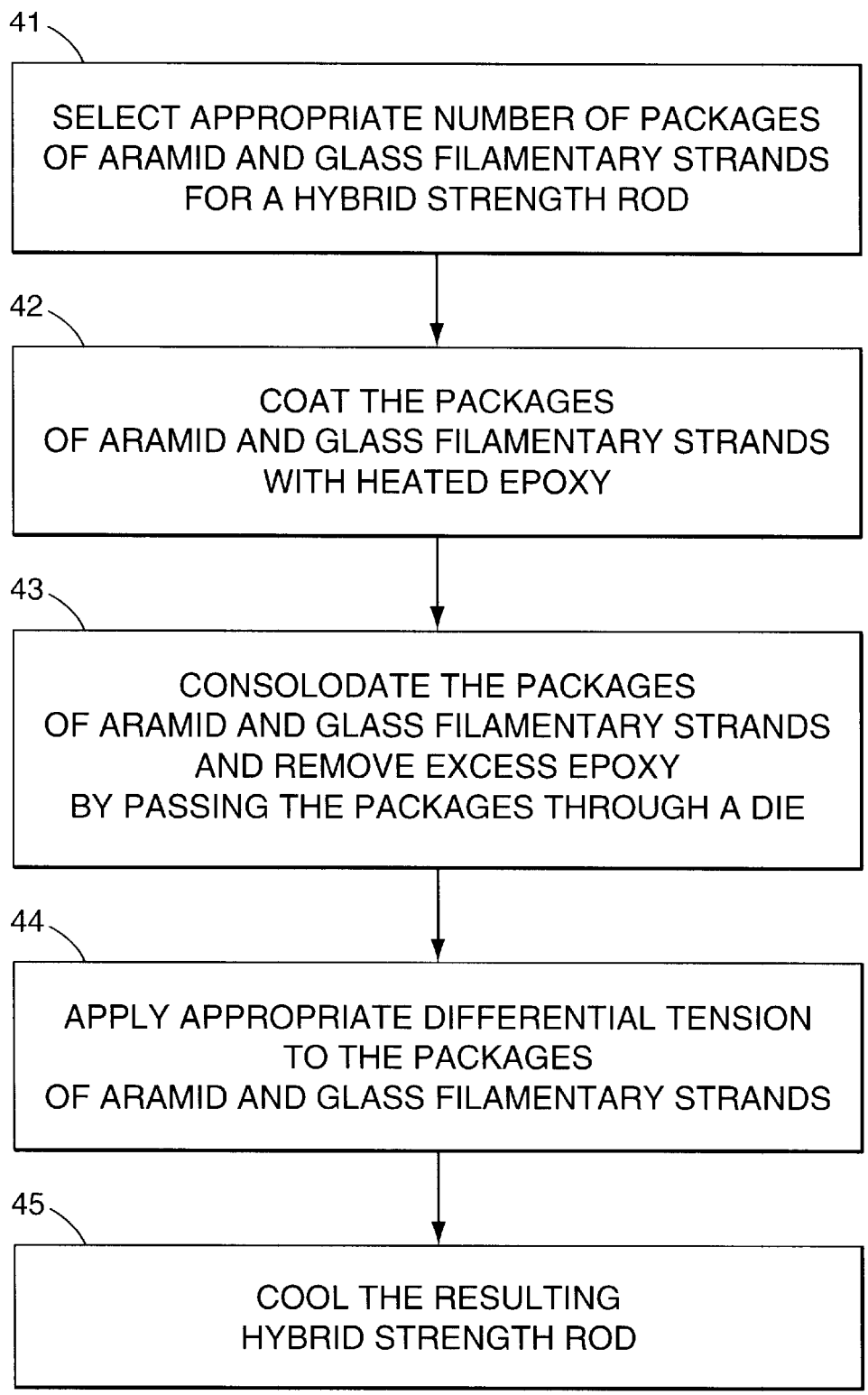
FIG. 4 is a flow-chart diagram of a method for making a hybrid strength member for an optical cable according to the invention.

Reference is made to FIGS. 1 and 2, which show an optical-fiber cable designated generally by the numeral 10. The cable 10 has a core that includes one or more optical fibers 101, which are disposed within a core tube 120 that extends along a longitudinal axis 105—105 of the cable. In a preferred embodiment, a bundle 100 of optical fibers is held together with a binder 102 that is helically wrapped around them. Alternatively, one or more linear arrays of fibers, in the form of ribbons, can be stacked together. Core tube 120 is, illustratively, made of a plastic material such as high-density polyethylene (HDPE), polypropylene, polyvinyl chloride (PVC), polybutylene terephthlate (PBT), or nylon.

The cable of the present invention may include a waterblocking provision, such as filling material 110, which is disposed within the core tube 120 and fills interstices among the bundles 100 and among the fibers 101 within each bundle. The filling material used in this design prevents the migration of water or other liquids along the cable's core. The filling material is such that its rheological properties in the operating temperature range allow easy movement of the fibers when they are strained. This is accomplished by considering the critical yield stress behavior of the filling material. At high temperatures, the filling material should remain in the cable and pass a flow test at 70° C. The material should be non-volatile, non-toxic, and chemically compatible with the optical fibers and other cable components. The filling material should be stable over the service life of the product. A suitable filling material 110 that has been used in the past is a colloidal gel such as disclosed in U.S. Pat. No. 5,187,763 that issued to C. F. Tu on Feb. 16, 1993. Nevertheless, the present invention does not require the use of filling materials.

A pair of rigid strength rods 300-1, 300-2 is positioned on diametrically opposite sides of the core tube 120 to impart compressive and tensile properties to the cable as discussed below. A plastic jacket 160, made of high-density polyethylene, for example, is extruded onto the above-described cable components to provide additional strength and protection from the environment. The strength rods 300-1 and 300-2 are at least partially embedded in the jacket 160 so that compressive and tensile loads that are applied to the jacket will be directly coupled to the strength rods. Advantageously, the strength rods are coated with a material that enhances such coupling.

Strength System

Ideally, a strength system should only include strong, flexible strands for handling tensile loads. (Optical glass fibers may rival the strength of steel for a given cross-section area, but they have very small cross sections and are not ductile.) Accordingly, filamentary strands of a material having high tensile strength would seem to provide the ideal strength system for an optical cable since they provide the most-flexible and smallest-diameter cable. However, flexible strength members with high tensile strength are inadequate to resist shrinkage of the plastic jacket 160 after extrusion onto the cable 10, and the strength system may need compressive strength also. Accordingly, the strength system of the present invention includes one or more rod-like strength members 300-1, 300-2 to protect the optical fibers 101 within the core tube 120 not only from excessive tensile loading during handling and service (e.g., aerial applications), but also from compressive loading when the plastic jacket 160 shrinks during thermal cycling, particularly after extrusion onto the cable components. Moreover, compressive strength may be needed to prevent the cable from buckling during installation and handling.

A pair of dielectric strength rods 300-1 and 300-2 having suitable tensile and compressive strength are symmetrically positioned on opposite sides of the core tube 120 and, preferably, extend linearly and parallel to the longitudinal axis 105 of the cable 10. Such an arrangement allows easy entry into the cable and access to the fibers for splicing. It is noted that the optical cable 10 of FIGS. 1 and 2 may optionally include additional components such as: (1) a waterblocking tape that surrounds the core tube 120; (2) rip cords; and (3) other kinds of strength members (see e.g., U.S. Pat. No. 5,838,864). However, such components are not shown in FIGS. 1 and 2 because they are not essential to the present invention.

Strength Member Fabrication

A hybrid strength member for an optical cable is made from all-dielectric materials, and provides excellent compressive and tensile properties within a single structure. The hybrid strength member is constructed from components which individually may not be capable of satisfying the minimum tensile and/or compressive properties required for the completed cable. However, when combined in the proper proportions and geometry, the resulting strength member inherits the favorable attributes of its components. Specifically, each strength member (also referred to as a rod) includes two concentric layers of filamentary strands that are embedded in epoxy. One layer imparts superior tensile modulus, with a minimal cross-section area, to the strength member but sacrifices compressive properties in return. The other layer provides the majority of the strength member's compressive properties while still contributing, to a lesser degree, to the tensile properties of the strength member.

Reference is made to FIG. 3, which shows a cross-section view of a hybrid strength member according to the present invention. In the preferred embodiment of the invention, hybrid strength members 300 provide both tensile and compressive modulus and strength. As discussed above, in order to keep the size of the rods small so that the overall cable can be small and flexible, the compressive properties of the rods should only be sufficient to inhibit shrinkage of the plastic jacket and to resist buckling during handling. Accordingly, rod 300 has an overall diameter, $d_3$, of about 2.5 mm (0.099 inches) in an illustrative embodiment. The hybrid strength member includes two concentric layers of filamentary strands. An inner layer 310 has a diameter, $d_1$, of about 1.45 mm (0.057 inches) and primarily comprises filamentary strands having a tensile modulus that exceeds 12 million pounds per square inch (psi). Illustratively, Kevlar® and/or Zylon® yarns and threads are suitable. More particularly, Kevlar 149 aramid fibers are used in the preferred embodiment of the invention, and are commercially available from E. I. DuPont de Nemours. The outer layer 320 has a diameter, $d_2$, of about 2.46 mm (0.097 inches) and primarily comprises filamentary strands having much better compressive strength than the inner layer. Glass and/or ceramic fibers are suitable for use in the outer layer. Electrical grade, continuous-filament glass fibers are used in the preferred embodiment of the invention, and are commercially available from PPG Industries, Inc. or Owens Corning, Inc. It is noted that the filamentary strands in these layers 310, 320 can be reversed, but such reversal may cause the rod 300 to have properties that are undesirable in optical cable applications. Finally, the outer layer 320 of strand materials is coated with a layer 330 of material that frictionally couples the rod 300 to the plastic jacket of the cable.

In the preferred embodiment of the invention, the plastic jacket 160 (see FIGS. 1 and 2) of the cable comprises polyethylene, and the coating material 330 is selected to provide a high coefficient of friction with polyethylene jackets. Testing reveals that it is undesirable for the strength rods to adhere too strongly to the plastic jacket. Heretofore an ethylene/acrylic acid copolymer (e.g., Dow Primacor 5990 E-AA) has been used as the coating material for the strength rod, but this makes the cable too stiff because of the lack of movement between the strength rod and the jacket. In the present invention, the coated strength rod is allowed to move somewhat with respect to the jacket and reposition itself during handling. Accordingly, coating materials are selected that do not adhesively couple to the jacket—either chemically or physically. In particular, coating materials are selected that frictionally couple to the jacket. Such materials need to be relatively soft (i.e., a hardness that is less than 80 D on the Shore durometer scale, but preferably greater than 35 D). Suitable materials include hot-melt compositions, thermoplastic elastomers, thermally crosslinkable rubbers, or any soft UV-curable, crosslinkable material. In the preferred embodiment of the invention, a thin layer e.g., about 0.025 mm (0.001 inches) of DuPont Hytrel® G4778 polyester elastomer is applied to the strength rod.

The process for fabricating a strength rod 300 according to the present invention is illustratively outlined by the steps shown in FIG. 4. The first step, designated 41 in FIG. 4, is for the designer to determine the desired tensile and compressive properties for the hybrid rod. Moreover, in the present invention, a dielectric rod having an overall diameter, $d_3$, of about 2.5 millimeters (0.1 inches) is desired. Illustratively, eight (8) packages of aramid fiber (Kevlar 149) strands are used—each package having an area of 0.00155 square inches; and ten (10) packages of electrical grade continuous filament glass are used—each package having an area of 0.00144 square inches.

In the step designated 42 in FIG. 4, the packages of aramid and glass filamentary strands are impregnated with a thermoset material, which may be cured by thermal treatment or by ultraviolet radiation. Examples of suitable thermoset materials include (i) epoxy resins, and (ii) crosslinked urethane acrylates. In the preferred embodiment of the present invention, an epoxy resin that has been heated to about 270° C. (520° F.) is used. The epoxy resin is selected to be compatible with the kinds of filamentary strands that are used. In the present invention, Fiberite 934 epoxy is used and is commercially available from the Fiberite Corporation.

The packages of aramid and glass fibers are then passed through a die to be consolidated into a single rod-like structure and to have excess epoxy removed. The die includes a central hole where the coated aramid fibers are inserted, and a plurality of holes (equal to the number of glass packages) surrounding the central hole where the coated glass fibers are inserted. This step is designated 43 in FIG. 4.

Step 44 directs the rod designer to apply appropriate differential tension levels to the glass and aramid fibers to compensate for thermal expansion effects. Such effects are based on the modulus, expansion coefficient, and operating temperature. The aramid fibers are maintained at a higher tension level than the glass fibers.

Tension is maintained on the consolidated strands of aramid and glass while the resulting rod is cooled in multiple stages from about 270° C. to about 20° C. (room temperature). This step is designated 45 in FIG. 4.

Each resulting dielectric rod has a tensile stiffness of about (750 pounds)/percent of extension, which is to say that the length of the rod will increase by one percent (1%) when a tensile force of (750 pounds) is applied. For comparison purposes, a dielectric rod that is exclusively fabricated from E-glass and epoxy and has a similar diameter (0.097 inches) would have a tensile stiffness in the range of 443–517 pounds/percent of extension for 60–70% by volume glass loading. Therefore, the hybrid strength member of the present invention provides from 45% to 70% more tensile stiffness for the same outside diameter than known dielectric rods, and has satisfactory compressive strength. Conversely, an all-glass rod having 750 pounds/percent of extension would need to have a diameter of about 0.12 inches, which is more than 20% larger than the present invention.

The above described hybrid strength rod is preferably installed within an optical cable without helical twisting or a reverse oscillating lay (ROL). Nevertheless, when it is desirable to twist the strength rods along the length of the cable, a smaller diameter rod is recommended. For example, the hybrid strength rods of the present invention may be used to replace the all E-glass rods shown in U.S. Pat. No. 5,838,864. These rods are installed with ROL twisting. In this situation, a hybrid rod having an outside diameter of 0.047 inches would have suitable flexibility for ROL twisting.

Prior Art

FIGS. 5 and 6 disclose an all-dielectric optical cable, which is disclosed in detail in U.S. Pat. No. 5,109,457. Briefly, this cable is generally designated by the numeral 70 and it includes several ribbon arrays 37 of optical fibers within a plastic core tube 34. A water-absorbing tape 44 surrounds the core tube. However, this tape provides little or no linear strength to the cable. Instead, the strength member system 60 comprises two pluralities of strength members, which are positioned adjacent to the core tube 34, and in engagement with the tape 44. The two pluralities of strength members are diametrically opposed and extend parallel to the longitudinal axis of the cable 70. All of the strength members 62, 64 comprise a substrate which is made of E-glass fiber filaments. However, the substrate of strength members 62 is impregnated with an epoxy material that causes them to become relatively stiff, and renders them capable of withstanding compressive stresses including those which are induced by thermal cycling and initial shrinkage of the jacket material. It is noted that the strength members 62, 64 have a diameter of about 2.0 millimeters (0.08 inches).

Although a particular embodiment has been shown and described, it is understood that various modifications are possible within the scope of the invention. These modifications include, but are not limited to: fabricating a hybrid strength member with more than two layers of filamentary strands, or with glass fibers in the inner layer and higher tensile strength fibers in the outer layer; combining the hybrid strength members of the present invention with different kinds of strength members in the same cable; constructing a cable using more than two hybrid strength members; and constructing hybrid strength members with non-circular cross sections.

What is claimed is:

1. An optical cable having a longitudinal axis and at least one core tube that extends in the direction of the longitudinal axis, said core tube including one or more optical fibers disposed therein, the cable further including a plurality of dielectric rods that are coupled to an outer plastic jacket of the, cable and extend in the direction of its longitudinal axis, said dielectric rods having a compressive stiffness that is effective to inhibit substantial contraction of the cable and a tensile stiffness that is effective to receive a tensile load without substantial transfer of the tensile load to the optical fibers,

CHARACTERIZED IN THAT each dielectric rod includes inner and outer layers of strand materials that are embedded in a thermoset material, said strand materials within one of the layers primarily comprising filamentary strands whose tensile modulus exceeds 12 million psi, said strand materials within the other layer primarily comprising glass and/or ceramic fibers.

2. The cable of claim 1 wherein the thermoset material comprises epoxy.

3. The cable of claim 1 wherein the filamentary strands within one of the layers primarily comprises aramid fibers, while the strands within the other layer primarily comprise glass fibers.

4. The optical cable of claim 3 wherein the filamentary strands within the inner layer primarily comprise aramid fibers and the strands within the outer layer primarily comprise electrical grade, continuous-filament glass fibers.

5. The cable of claim 1 wherein the dielectric rods are symmetrically disposed on opposite sides of the core tube, which is positioned along the longitudinal axis of the cable, said rods being twisted around the core tube along the length of the cable with a reverse oscillating lay.

6. The cable of claim 1 further including a waterblocking filling material that is disposed within the core tube.

7. The cable of claim 1 wherein the dielectric rods are at least partially embedded within the plastic jacket.

8. The cable of claim 1 wherein the outer layer of strand materials is surrounded by a coating material that enhances coupling between the rod and the plastic jacket.

9. The cable of claim 8 wherein the coating material has a chemical structure that is substantially different from that of the plastic jacket.

10. The cable of claim 9 wherein the coating material has a hardness that is less than 80 D as measured on the Shore durometer scale.

11. The cable of claim 10 wherein the coating material has a hardness that is between 35 D and 80 D as measured on the Shore durometer scale.

12. The cable of claim 8 wherein the plastic jacket comprises polyethylene and the coating material is selected from the group consisting of:

(i) thermoplastic elastomers;

(ii) thermally crosslinkable rubbers;

(iii) UV-curable crosslinkable rubbers; and (iv) a hot-melt composition.

13. A dielectric rod having tensile and compressive stiffness, said rod comprising inner and outer layers,of filamentary strands that are embedded in a thermoset material, the inner layer primarily comprising aramid fibers whose tensile modulus exceeds 12 million psi, the outer layer primarily comprising electrical grade, continuous-filament glass fibers.

14. The dielectric strength rod of claim 13, said rod being embedded within a plastic jacket of an optical cable, said optical cable having a longitudinal axis and at least one tubular member that extends in the direction of the longitudinal axis, said tubular member including one or more optical fibers disposed therein.

15. An optical fiber cable comprising:

a core comprising at least one optical fiber;

a tubular member, which encloses said core;

a jacket, which is made of a plastic material and which encloses said tubular member; and a dielectric strength member system, which is held adjacent to the tubular member by the jacket and which is substantially embedded in the jacket, said strength member system comprising two diametrically opposed linear members extending parallel to a longitudinal axis of the cable and being coupled to the jacket, each strength member including two concentric layers of strength fibers embedded in a thermoset material, one of said layers primarily comprising aramid fibers and the other of said layers primarily comprising electrical grade, continuous-filament glass fibers.

16. The optical fiber cable of claim 15 wherein aramid fibers comprise the innermost concentric layer of strength fibers and glass fibers comprise the outermost concentric layer of strength fibers.

17. The optical fiber cable of claim 16 wherein the outermost concentric layer of strength fibers is surrounded by a coating material that enhances coupling between the strength member and the jacket.

18. The optical fiber cable of claim 15 wherein the jacket comprises polyethylene and the coating material is selected from the group consisting of:

(i) thermoplastic elastomers;

(ii) thermally crosslinkable rubbers;

(iii) UV-curable crosslinkable rubbers and (iv) a hot-melt composition.

19. The optical fiber cable of claim 15 further including a waterblocking filling material disposed within the tubular member.

* * * * *